E0152 XR 3,704,419

Rheinfelder

[15] 3,704,419

[45] Nov. 28, 1972

[54] AUTOMATIC COMPENSATION OF CABLE TELEVISION SYSTEMS

[72] Inventor: William A. Rheinfelder, South Laguna, Calif.

[73] Assignee: Anaconda Astrodata Co., Anaheim, Calif.

[22] Filed: Jan. 14, 1971

[21] Appl. No.: 106,400

Related U.S. Application Data

[63] Continuation of Ser. No. 560,696, June 27, 1966, abandoned.

[52] U.S. Cl................325/308, 330/86, 178/DIG. 13

[51] Int. Cl................H04b 1/06

[58] Field of Search......325/415, 411, 406, 400, 308, 325/397; 178/6 P, 6 D; 179/1.1, 175, 31, 15; 330/23, 25, 31, 40, 94, 95, 96, 143, 144, 145, 57, 109, 183, 6, 19; 333/17, 181, 28 A

[56] References Cited

UNITED STATES PATENTS

| | | | |
|---|---|---|---|
| 3,173,110 | 3/1965 | Albersheim | 333/18 |
| 3,204,191 | 8/1965 | Redwood, Jr. | 330/23 R |
| 3,535,640 | 10/1970 | Forrest, Jr. | 325/308 |
| 2,876,283 | 3/1959 | Lundry | 333/18 R |
| 3,382,445 | 5/1968 | Williams et al. | 330/23 |

OTHER PUBLICATIONS

Maintenance of CATU Systems by Halleth Telephone Engineer & Management Vol. 69 No. 22 Nov. 15, 1965 pp. 37–41

Rheinfelder Wm. A. Designing Automatic Gain Control System BBE Jan. 1965, page 53 to 57

*Primary Examiner*—Robert L. Griffin
*Assistant Examiner*—Barry L. Leibowitz
*Attorney*—White, Haefliger & Bachand

[57] ABSTRACT

The invention concerns a cable television system wherein provision is made for effective automatic compensation for signal attenuation due to system temperature change, as for example in spaced AGC amplifiers.

6 Claims, 10 Drawing Figures

INVENTOR.
WILLIAM A. RHEINFELDER
By White & Haefliger
ATTORNEYS.

INVENTOR.
WILLIAM A. RHEINFELDER
BY White & Haefliger
ATTORNEYS.

AUTOMATIC COMPENSATION OF CABLE TELEVISION SYSTEMS

This application is a continuation of application Ser. No. 560 696 filed 6-22-66 now abandoned.

This invention relates generally to cable television, and more particularly concerns compensation for variations in attenuation of cable transmitted signals.

In cable television systems variations in signal attenuation and distortion result from causes that include the following: changes in temperature leading to relatively large errors in signal level; particularly immediately preceding automatic gain control or AGC amplifiers; changes in amplifier characteristics with temperature, errors in amplifier spacing, arbitrary location of splitters and power supplies, arbitrary splices of cable, and cascading of amplifiers each of which has associated inaccuracies of gain or frequency response. Such errors lead to overload, i.e. distortion, or excessive noise on some television channels, so that a limitation is set on maximum system length. Field adjustments to obtain greater accuracy are generally impossible due to systematic errors and limited accuracy available with field instrumentation.

It is a major object of the present invention to overcome the above as well as other problems associated with cable television systems through the provision of an essentially maintenance free cable television system and concept. Basically, the new system is characterized by use of main trunk amplifiers prealigned at the factory, with gain set for fixed spacing in the field (e.g. about 22db at 213 megacycles), provision of automatic correction for spacing errors, automatic correction for cable changes in attenuation as for example result from temperature change, automatic signal level control, the absence of jumper cables realized in practice by use of amplifier housings having built-in cable connections and built-in auxiliary equipment such as directional taps and signal splitters, and provision for constant level signal input to the cable system at head end equipment. Also, the cable may be precut to provide sections of equal length, to enable "building-block" installation in the field. Typically, special amplifiers provided in the system contain automatic correction for errors in spacing as well as errors due to temperature variations of the cable. Such amplifiers sense the deviation of the signal level from the system standard and make the necessary corrections automatically. Also, such amplifiers typically operate to readjust the signal levels within the system to a high degree of accuracy by comparison with a built-in level standard.

Among the unusually advantageous results of the invention are the facilitation of increased system cascaded lengths for a given freedom from noise and distortion, an increase in the overload to noise ratio for a given system length, elimination of errors due to incorrect spacing or temperature change, elimination of errors due to use of jumper cables, splices, and the like, and the overall provision of a maintenance-free cable television system.

These and other objects and advantages of the invention, as well as the details of illustrative embodiments, will be more fully understood from the following detailed description of the drawings, in which.

Figure 1:
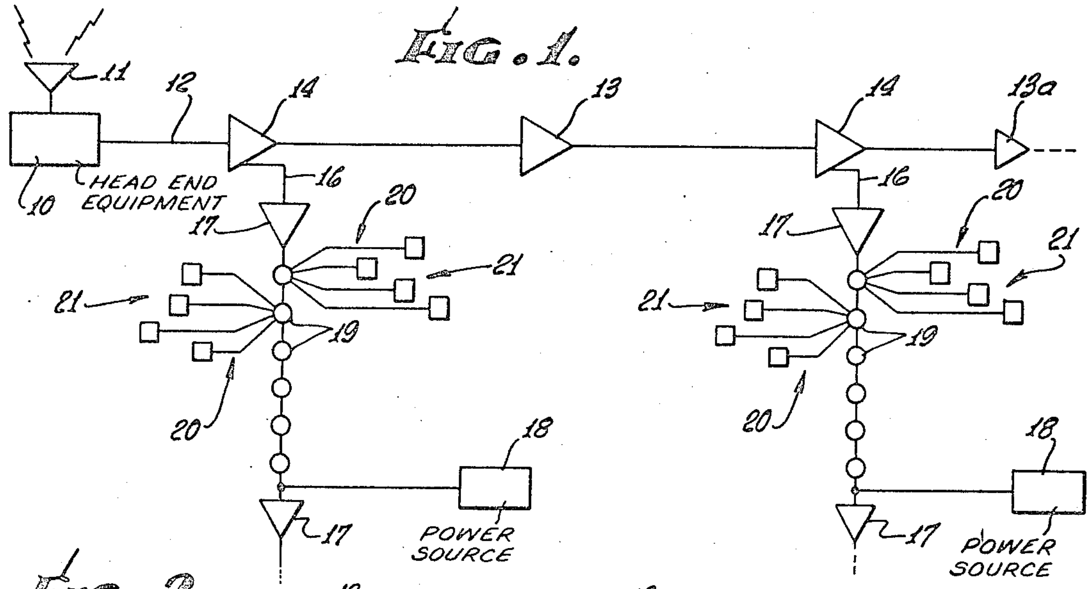
FIG. 1 is a generalized block diagram showing a portion of a cable television system.

Referring first to FIG. 1, the illustrated cable television system includes head and equipment 10 with antenna 11 to pick-up broadcast multi-channel television signals. Such equipment is known and is operable to correct and adjust the signal level for each channel, with separate correction for picture and sound carriers. Such equipment also typically includes preamplifiers, demodulators, modulators, for each channel, together with a multi-channel combining network, the constant level output of which is applied to the cable system.

Figures 6, 10:
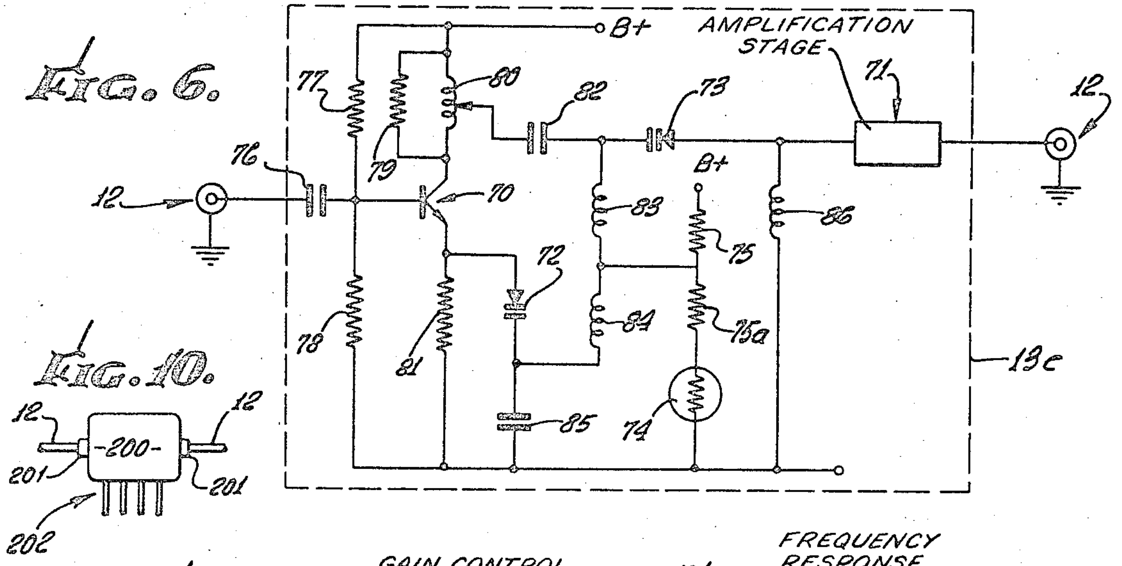
FIG. 6 is a diagram of another circuit operable in an AGC amplifier used in a FIG. 1 type system to achieve compensation for changes in cable signal level due to temperature change.
FIG. 10 shows an amplifier housing and connections.

To the right of the equipment 10 is shown a main trunk line which is the major link from the head end 10 to the community. It consists of coaxial cable 12 with repeater or main trunk amplifiers 13 connected in series with and spaced along the cable. AGC amplifiers as represented at 13*a* are also typically connected in series with the cable to provide automatic correction for changes in signal level. The main trunk line also includes bridging amplifiers 14, each having several outputs and enough gain to make up for isolation loss and power loss inherent in multiple outputs. From the bridging amplifier feeder lines are run along a row of subscriber's houses. The feeder lines include coaxial cable 16 and line extender amplifiers 17 operable to compensate for the loss in the feeder system. As an example, each feeder line may include four to ten or more line extender amplifiers. The amplifiers typically have built-in cable connections and built-in equipment such as directional taps and splitters, as described in the copending application of Dalton A. Becker entitled, "Cable Television Circuit Box Assembly." Power to the cable is supplied at permissible levels as by the transformers or other sources 18. Between successive amplifiers 17, directional taps or couplers 19 are provided, typically with multiple outputs 20 to which individual home receivers 21 are connected. For example, a four house tap is typically used every 150 feet. See also FIG. 10, showing an amplifier housing 200 having integral connection 201 for input and output cable 12, and outlets 202 from a contained signal splitter.

Figure 2:
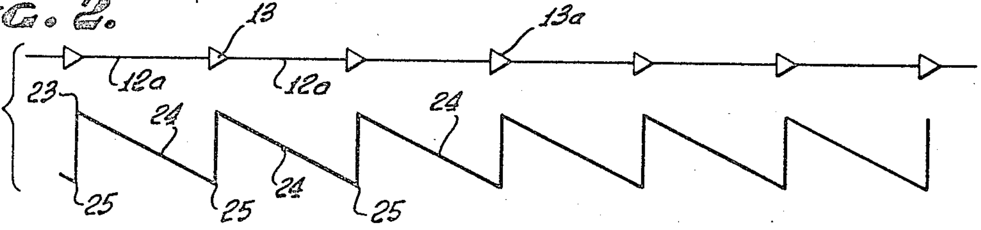
FIG. 2 is a cable signal level diagram.
Figure 3:
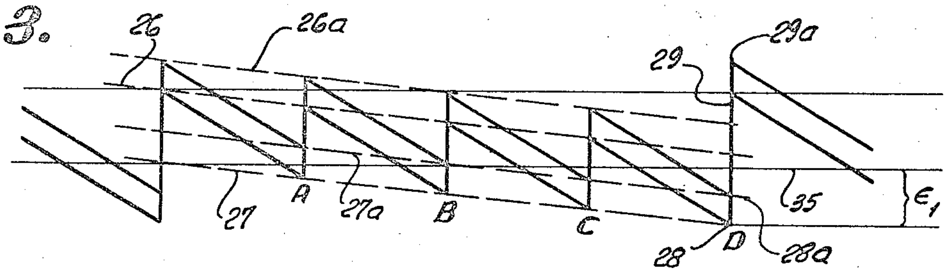
FIG. 3 is a signal level diagram showing change of attenuation due to cable heating, and compensation for such change.
Figure 4:
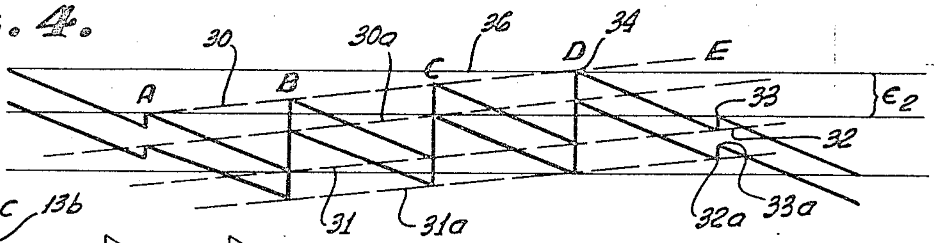
FIG. 4 is a signal level diagram showing change of attenuation due to cable cooling, and compensation for such change.

Referring now to FIG. 2, automatic gain control amplifiers 13*a* are shown at regular intervals in the main trunk line, as for example every fourth amplifier position. The other amplifiers (as for example repeaters) in the line include bridger amplifiers as described in FIG. 1. The function of the latter is to restore desired signal level, as indicated by points 23 in the associated level diagram, lines 24 indicating attenuation during signal transmission along cable runs 12*a*. The AGC amplifiers on the other hand serve to compensate for all errors not otherwise corrected by the other amplifiers, such errors including signal level change or attenuation with temperature, and errors in spacing. Note that the cable sections between amplifiers may be pre-cut so as to minimize errors in spacing. Thus, as the temperature increases or decreases, the effective lengths of the sections change uniformly. In FIG. 2, losses are exactly compensated by the amplifiers, all maximum signal levels 23 are identical, and all minimum signal levels 25 are identical. A system may be designed to approach such ideal compensation at design temperature; however, if the temperature increases or decreases, compensation unavoidably varies, as seen in FIGS. 3 and 4.

With temperature increase, the maximum signal levels drop at the outputs of successive amplifiers, as indicated by the downward tilt of line 26. and likewise the minimum signal levels drop as indicated by the downward tilt of line 27. At point 28 the maximum signal is brought back in the AGC amplifier to the standard level 29; however, the drop in minimum signal level to point 28, which is well below normal minimum level 35 is found to result in excessive noise in the cable transmission system, particularly in very hot weather. A similar undesirable condition exists with temperature decrease, the maximum signal level increasing at the outputs of successive amplifiers as indicated by the upward tilt of line 30 in FIG. 4. Likewise, the minimum signal level increases as indicated by the upward tilt of line 31. At point 32 the minimum signal is brought back in the AGC amplifier to the standard level 33; however, the climb in associated maximum signal level to point 34, which is well above normal maximum level 36, is found to result in excessive distortion in the cable transmission system, particularly in very cold weather. In this regard, the amplifiers are exposed to such hot and cold weather, inasmuch as they are typically suspended on telephone poles or other outdoor supports.

In accordance with an important aspect of the invention, means is provided to alter amplifier gain in response to temperature change so as to compensate such additional attenuation, such means including impedance that is changed in response to temperature change and which is connected in controlling relation with control (as for example AGC) amplifiers between which repeater amplifiers are spaced. Typically, the impedance is connected to offset the increased and reduced signal attenuation due to temperature increase and decrease, as for example is seen in FIGS. 3 and 4. In the former, the error $\epsilon_1$, representing the difference between actual minimum and normal minimum signal levels 28 and 35, is split in such manner as to bring up the actual minimum level 28 to the level 28*a*, whereby tilted lines 26*a* and 27*a*, vertically offset from lines 26 and 27, define the adjusted maximum and minimum signal levels at the outputs and inputs respectively of the amplifiers. Thus, the AGC amplifier 13*a* brings the maximum signal level up to point 19*a*, the input to the AGC amplifier being raised to level 28*a*. Similarly, in FIG. 4, the error $\epsilon_2$ representing the difference between actual maximum and normal maximum signal levels at 34 and 33 is split in such manner as to reduce the actual maximum level as represented by line 30 to the level 30*a*, whereby lines 30*a* and 31*a* vertically offset from lines 30 and 31, define the adjusted maximum and minimum signal levels at the outputs and inputs respectively of the amplifiers. Thus, the AGC amplifier 13*a* brings the maximum signal level up to point 33*a* (below 33), the input to the AGC amplifier being reduced to 32*a*. The difference between levels 29 and 29*a* is accordingly about ½ $\epsilon_1$, and the difference between levels 33 and 33*a* is about ½ $\epsilon_2$.

Figure 5:
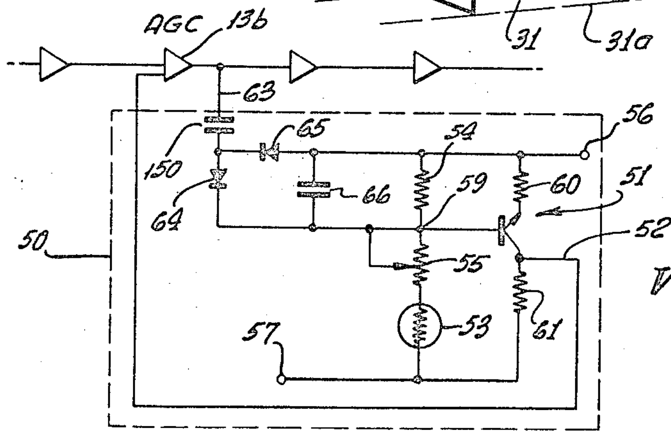
FIG. 5 is a diagram of a circuit operable to control the output level of an AGC amplifier in a FIG. 1 type system to produce the FIG. 3 and FIG. 4 compensation.

FIG. 5 illustrates one form of means 50 to alter gain of a control amplifier as indicated at 13*b* in response to temperature change, so as to compensate the additional attenuation. Basically, the device 50 includes a D.C. amplifier, which may for example comprise transistor 51, having an input connection providing voltage input that varies with temperature change induced change of impedance, the voltage input also varying with the rectified voltage output of the control amplifier 13*b*. Also, the D.C. amplifier output a 52 is connected in feedback or closed loop relation to the control amplifier, to compensate the additional attenuation of the cable due to temperature change, as for example in the manner described in connection with FIGS. 3 and 4.

More specifically in FIG. 5, the control comprises a thermistor 53 connected in series with the bias circuit that includes fixed resistor 54, adjustable resistor 55, and terminals 56 and 57 for suitable supply voltage, the base electrode 58 of transistor 51 connected to point 59 of the bias circuit. Note also the resistors 60 and 61 respectively connected with the transistor emitter and collector terminals as shown. The r.f. output of the control amplifier 13*b* is connected at 63 with rectifier network that includes rectifiers 64 and 65, a shunt capacitor being provided at 66. Thus, rectified r.f. is supplied to point 59 at the base input to transistor 51.

FIG. 6 illustrates another form of means to alter gain of the control amplifier, as indicated at 13*c*, and in response to temperature change so as to compensate the additional attenuation. Basically, the compensation or equalization circuit is incorporated in the control amplifier 13*c*, as exemplified by temperature controlled impedance connected in openloop network relation with transistor amplification stages 70 and 71. Typically, the control impedance comprises at least one voltage sensitive variable capacitance diode, and a thermistor connected in voltage controlling relation with the diode. As illustrated, a first voltage sensitive variable capacitance diode 72 is connected as shown in the emitter circuit of transistor 70 to control gain, and a second voltage sensitive variable capacitance diode 73 is connected as shown in intercoupling relation with transistors 70 and 71, to control the frequency response to the cable transmitted signals. A thermistor 74 is connected in the voltage divider circuit that includes resistors 75 and 75*a*, to develop control voltage applicable to the diodes 72 and 73. Thus, gain may be controlled by compensate the additional attenuation of the cable due to temperature change, as for example in the manner described in connection with FIGS. 3 and 4. Changes in frequency response due to temperature change are also compensated. Other circuit components are connected as shown and numbered as indicated.

Figure 7:
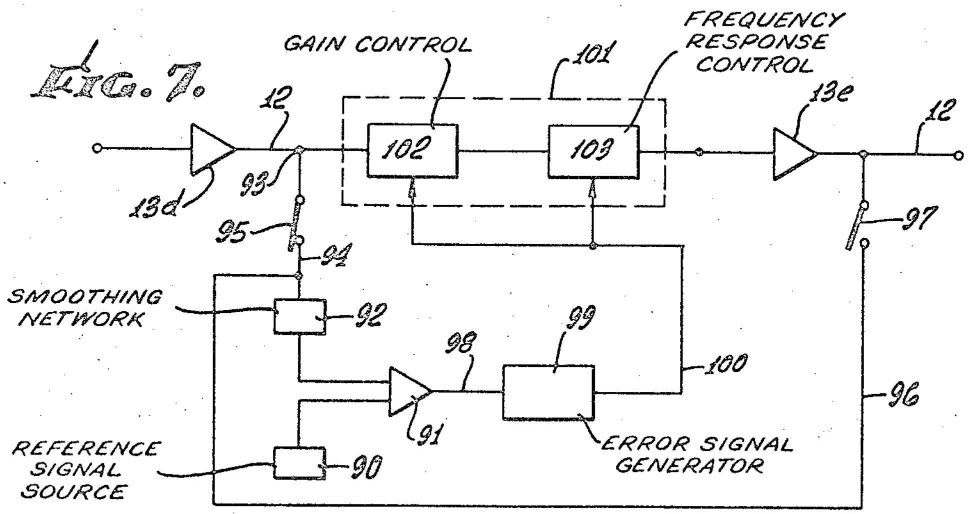
FIG. 7 is a block diagram of still another circuit usable to achieve compensation for change in cable signal level due to errors in spacing.
Figure 9:
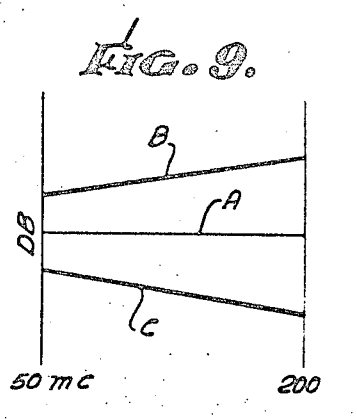
FIG. 9 is a graph showing tilt-compensated gain control.

FIG. 7 illustrates the provision of a different form of equalizer to compensate the additional attenuation referred to above, whether that attenuation is due to temperature change or inaccurate amplifier spacing. The equalizer includes a reference signal source 90, as for example a divider to produce a reference level voltage, the output of which is fed to comparator 91. The latter also has input connection to the cable 12 via a suitable r.f. rectification and smoothing network 92, the cable connection being alternately at the output side 93 of repeater amplifier 13*d*, or at the output side of repeater amplifier 13*e*, via leads and switches 94—97. The comparator is operable to produce an error signal at 98 driving a generator 99 producing a correction signal, i.e. a version of the error signal, at 100. The equalizer also includes a network 101 connected in series with the cable 12 and responsive to signal 100 to control cable transmitted signal level and frequency response. Thus, gain may be controlled at 102 and frequency response may be controlled at 103. For example, as seen in FIG. 9, level A represents a flat alignment with fixed gain at all frequencies to exactly match theoretical attenuation by the cable between successive amplifiers, at predetermined normal operating temperature. Tilted levels B and C represent gain to match tilted signal attenuation levels that differ due to cable temperature changes, level B matching increased attenuation due to cable temperature increase (or cable length increase between amplifiers) and level C matching decreased attenuation due to cable temperature decrease (or cable length decrease between amplifiers). Note the difference in response at different temperatures, to match or compensate for changes in cable attenuation.

Figure 8:
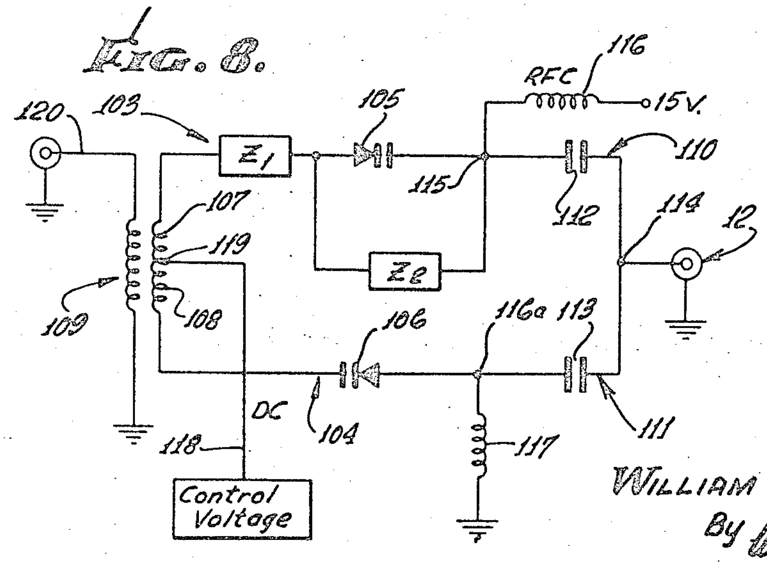
FIG. 8 is a diagram of a circuit usable in the FIG. 7 block diagram.

FIG. 8 illustrates one way to mechanize the network 101, the latter including a bridge circuit 102 having legs 103 and 104 containing variable capacitance diodes 105 and 106 and portions 107 and 108 of the secondary coil of a transformer 119. The bridge also includes legs 110 and 111 containing capacitors 112 and 113; bridge output terminal 114 is connected to the cable; bridge terminal 115 is supplied with voltage, say +15 volts, through choke 116; bridge terminal 116*a* is grounded through choke 117 and D.C. error voltage is supplied at 118 to bridge input terminal 119, the center tap location. The input r.f. signal at 120 is coupled to the bridge via the transformer 109. A selected input error voltage, say 1.0 volt, corresponds to null condition of the bridge, i.e. as corresponds to level below C in FIG. 9. Increase of the error voltage from 1.0 volts changes the relative capacitance of diodes 105 and 106 and likewise the gain and response as indicated by representative levels C, A and B in FIG. 9. Suitable impedances $Z_1$ and $Z_2$, as for example resistance and inductance combinations, are shown as connected in leg 103 to aid in producing desired gain and response control.

Summarizing, FIG. 6 illustrates the use of a temperature insensitive control component (72 and/or 73) in the r.f. portion of the amplifier, and in open loop configuration, the control component being in turn controlled by a temperature sensitive component (for example thermistor 74); FIG. 7 illustrates the use of a temperature insensitive control component (101), which is in turn controlled in response to changes in the input or output signal of an amplifier relative to a reference signal or voltage, the configuration being closed loop; FIG. 7 also illustrates the use of the reference signal 90 to correct for errors in spacing of amplifiers and to control signal levels; and FIG. 5 illustrates the use of a closed loop control configuration where the reference signal or voltage, not in the r.f. portion of the amplifier is independently changed in response to temperature change. In this regard, one or more components in the r.f. portion of an amplifier may themselves be temperature sensitive to help compensate for errors due to temperature change.

The above principles contribute to improvements in the design and performance of the overall system as seen in FIG. 1 in the following respects; the main trunk or line amplifies may be factory aligned to high accuracy so as not to require adjustment after installation in the system; the amplifiers and system equipment may be designed to eliminate the use of jumper cables, and may contain their own cable connectors or connection to the transmission cable in the shortest direct manner; the head and equipment may be operated to maintain system signal input level constant; the amplifier construction and cable length may be standardized or made modular, so as to be assembled rapidly in "building-block" fashion in the field, and without arbitrary and haphazard location of cable splices, signal splitters and power supplies. See in this regard the book, "-CATV System Engineering" by William A. Rheinfelder, published January 1966 by TAB Books.

Merely as illustrative, the components of the various circuits described above may be identified and have values approximately as follows:

| | |
|---|---|
| FIG. 5 | |
| Capacitors | |
| 66 | 0.001 ufd |
| 150 | 0.001 ufd |
| Diodes | |
| 64 | D 3530 |
| 65 | D 3530 |
| Transistor | |
| 51 | 2N834 |
| Resistors | |
| 54 | 10 K Ω |
| 55 | 68 K Ω |
| 60 | 120 Ω |
| 61 | 10 K Ω |
| Thermistor | |
| 53 | 2 K Ω |
| FIG. 6 | |
| Capacitors | |
| 76 | 0.001 ufd |
| 82 | 0.001 ufd |
| 85 | 0.001 ufd |
| Diodes | |
| 72 | 27 pfd |
| 73 | 47 pfd |
| Transistors | |
| 70 | 20N 3866 |
| Resistors | |
| 75 | 4.7 K Ω |
| 75*a* | 8.2 K Ω |
| 77 | 4.7 K Ω |
| 78 | 1 K Ω |
| 79 | 150 Ω |
| 81 | 150 Ω |
| Coils | |
| 80 | 4+4 turns |
| 83 | 10 turns RFC |
| 84 | 10 turns RFC |
| 86 | 10 turns RFC |
| Thermistor | |
| 74 | 1 K Ω |
| FIG. 8 | |

0077 106008 0070

| | |
|---|---|
| Capacitors | |
| 112 | 0.001 ufd |
| 113 | 0.001 ufd |
| Diodes | |
| 105 | 27 pfd |
| 106 | 47 pfd |
| Transformer | |
| 109 | 4+4+4 turns, Toroid |
| Coils | |
| 116 | 10 turns RFC |
| 117 | 10 turns RFC |

I claim

1. In a cable television system, a cable to transmit multiple channel television signals for distribution to subscriber equipment, the signals being subject to attenuation during said cable transmission, multiple solid state wideband r.f. amplifiers electrically connected in series with the cable at predetermined intervals to amplify the transmitted signals and thereby compensate said attenuation, the system being subject to additional signal attenuation that varies as a function of signal frequency, and equalizer means to compensate said additional attenuation and including a fixed reference signal source and a comparator responsive to the reference signal and to the cable transmitted signals to produce an error signal, said means also including a network connected in series with said cable and responsive to a version of said error signal to control cable transmitted signal level and frequency response, the network including impedance to compensate for changes in cable effective length.

2. The system of claim 1, in which said network includes a bridge circuit having legs containing variable capacitance diodes and a transformer tapped to supply said error signal as a voltage acting to drive the bridge toward increased attenuation whereby transmitted signal level and frequency response are temperature compensated.

3. The system of claim 1, including housings for said amplifiers having integral cable connections, the amplifiers having pre-aligned construction, the cable including main trunk sections, and including equipment connected to deliver substantially constant level television signals to the head end of the main trunk cable.

4. In a cable television system, a cable to transmit multiple channel television signals for distribution to subscriber equipment, the signals being subject to attenuation during said cable transmission, multiple solid state wideband r.f. amplifiers including control amplifiers and repeater amplifiers electrically connected in series with the cable at predetermined intervals to amplify the transmitted signals and thereby compensate the attenuation, the system being subject to temperature change productive of additional signal attenuation that varies as a function of signal frequency, and means connected with said control amplifiers to alter the gain thereof in response to said temperature change so as to overcompensate said additional attenuation, said means including impedance comprising at least one adjusted variable impedance element and a thermistor connected with said element, repeater amplifiers being spaced between said control amplifiers, said overcompensation determined by the adjusted impedance of said element and characterized by raising the control amplifier transmitted signal by an amount approximately ½ $\epsilon$ above the normal temperature maximum signal levels in response to temperature increase above said normal temperature, where ½ $\epsilon$ is the difference between the actual minimum signal level at the input side of a control amplifier due to said temperature increase in the absence of said means and normal temperature minimum signal level at the input side of the control amplifier.

5. The system of claim 4 in which said means includes a D.C. amplifier having an input connection providing voltage input that varies with said impedance and with the rectified output of said control amplifier, the D.C. amplifier output connected in feedback relation with the input to the control amplifier.

6. The system of claim 5, in which said D.C. amplifier includes a transistor wherein said input connection includes a control electrode, said impedance comprising a thermistor connected in biasing relation with said control electrode.

* * * * *